US010641948B2

(12) United States Patent
Hung et al.

(10) Patent No.: US 10,641,948 B2
(45) Date of Patent: May 5, 2020

(54) FRAME ASSEMBLY AND DISPLAY DEVICE

(71) Applicants: Radiant (Guangzhou) Opto-Electronics Co., Ltd., Guangzhou, Guangdong (CN); Radiant Opto-Electronics Corporation, Kaohsiung (CN)

(72) Inventors: Hui-Hua Hung, Kaohsiung (TW); Chi-Chih Lu, Kaohsiung (TW)

(73) Assignees: RADIANT (GUANGZHOU) OPTO-ELECTRONICS CO., LTD., Guangzhou, Guangdong (CN); RADIANT OPTO-ELECTRONICS CORPORATION, Kaohsiung (TW)

( * ) Notice: Subject to any disclaimer, the term of this patent is extended or adjusted under 35 U.S.C. 154(b) by 43 days.

(21) Appl. No.: 16/104,196

(22) Filed: Aug. 17, 2018

(65) Prior Publication Data
US 2019/0049656 A1 Feb. 14, 2019

Related U.S. Application Data

(63) Continuation of application No. PCT/CN2017/096542, filed on Aug. 9, 2017.

(51) Int. Cl.
F21V 8/00 (2006.01)
(52) U.S. Cl.
CPC ......... G02B 6/0088 (2013.01); G02B 6/0091 (2013.01)
(58) Field of Classification Search
CPC .................. G02B 6/0088; G02B 6/0091

USPC .......................................... 362/611
See application file for complete search history.

(56) References Cited

U.S. PATENT DOCUMENTS

| 7,588,362 | B2 * | 9/2009 | Park | G02F 1/133603 349/61 |
|---|---|---|---|---|
| 9,658,389 | B2 * | 5/2017 | Jeoung | G02B 6/0088 |
| 2006/0227571 | A1 * | 10/2006 | Kuo | G02B 6/0088 362/619 |
| 2008/0088762 | A1 * | 4/2008 | Sawada | G02B 6/0081 349/58 |
| 2008/0143918 | A1 * | 6/2008 | Kim | G02F 1/133608 349/58 |
| 2008/0266483 | A1 * | 10/2008 | Kim | G02B 6/0088 349/58 |

(Continued)

FOREIGN PATENT DOCUMENTS

| CN | 102644887 A | 8/2012 |
|---|---|---|
| CN | 202584628 U | 12/2012 |

(Continued)

Primary Examiner — Bryon T Gyllstrom
(74) Attorney, Agent, or Firm — McClure, Qualey & Rodack LLP

(57) ABSTRACT

A frame assembly and display device are provided. The frame assembly includes a mounting member, a sliding member, a top cover and a bottom cover. The sliding member is slidably disposed on the mounting member, in which the sliding member has at least one mounting hole and at least one engaging plate. The top cover has at least one protruding lug, in which the protruding lug is accommodated in the mounting hole, and at least one portion of the protruding lug is positioned by the engaging plate. The bottom cover has at least one engaging hook, in which the engaging hook is engaged in the mounting hole.

7 Claims, 9 Drawing Sheets

(56) References Cited

U.S. PATENT DOCUMENTS

| | | | |
|---|---|---|---|
| 2009/0052202 A1* | 2/2009 | Tsai | B60Q 1/0433 |
| | | | 362/549 |
| 2009/0190306 A1* | 7/2009 | Tang | E05C 9/046 |
| | | | 361/679.58 |
| 2009/0316342 A1* | 12/2009 | Li | H04M 1/0254 |
| | | | 361/679.01 |
| 2010/0097542 A1* | 4/2010 | Lee | G02B 6/0083 |
| | | | 349/62 |
| 2011/0095547 A1 | 4/2011 | Liu et al. | |
| 2013/0155346 A1* | 6/2013 | Li | G02F 1/133308 |
| | | | 349/58 |
| 2013/0215357 A1 | 8/2013 | Wu et al. | |
| 2015/0219839 A1* | 8/2015 | Jung | G02B 6/0091 |
| | | | 362/606 |
| 2019/0094602 A1* | 3/2019 | Jung | G02B 6/0088 |

FOREIGN PATENT DOCUMENTS

| | | |
|---|---|---|
| CN | 102044644 B | 4/2014 |
| CN | 104200752 A | 12/2014 |
| CN | 204479882 U | 7/2015 |
| CN | 106646962 A | 5/2017 |
| CN | 206961448 U | 2/2018 |
| JP | 2009103979 A | 5/2009 |
| TW | I417615 B | 12/2013 |
| TW | M525590 U | 7/2016 |

\* cited by examiner

FRAME ASSEMBLY AND DISPLAY DEVICE

RELATED APPLICATIONS

This application is a continuation application of International Application No. PCT/CN2017/096542 filed on Aug. 9, 2017, which is incorporated herein by reference.

BACKGROUND

Field of Invention

The present invention relates to a frame assembly and its application. More particularly, the present invention relates to a frame assembly in which is applicable to a display device.

Description of Related Art

A display device mainly includes a backlight module, a display panel and an outer frame. Moreover, a mold frame for carrying the display panel is disposed on the backlight module. After the display panel is disposed on the mold frame, the outer frame is used to fix the mold frame, the display panel and the backlight module, so as to finish assembly of the display device.

A conventional method for fixing the outer frame is a screw locking method. However, this method has many disadvantages. For example, the structure of the outer frame is likely to be damaged by screws and its appearance will be affected.

SUMMARY

One object of the present invention is to provide a frame assembly and a display device which can be easily assembled and have better assembly robustness and appearance.

According to the aforementioned object, a frame assembly is provided. The frame assembly includes a mounting member, a sliding member, a top cover and a bottom cover. The sliding member is slidably disposed on the mounting member, in which the sliding member has at least one mounting hole and at least one engaging plate. The top cover has at least one protruding lug, in which the protruding lug is accommodated in the mounting hole, and at least one portion of the protruding lug is positioned by the engaging plate. The bottom cover has at least one engaging hook, in which the engaging hook is engaged in the mounting hole.

According to an embodiment of the present invention, the protruding lug of the top cover includes a first extending portion and a first positioning portion. The first extending portion extends along a depth direction of the mounting hole, and the first positioning portion extends along an extending direction, which is vertical to the depth direction, and the first positioning portion is restrained by the engaging plate.

According to an embodiment of the present invention, the engaging plate has an engaging passageway, and the first extending portion is engaged in the engaging passageway.

According to an embodiment of the present invention, the engaging plate includes a first engaging unit and a second engaging unit opposite to the first engaging unit, in which an engaging passageway is defined between the first engaging unit and the second engaging unit, and the first extending portion is engaged in the engaging passageway. The top cover has a first main body, in which the protruding lug extends from one side of the first main body, and the first main body covers the first engaging unit, and the first positioning portion of the protruding lug is restrained by the second engaging unit.

According to an embodiment of the present invention, the engaging hook of the bottom cover includes a second extending portion and a second positioning portion. The second extending portion extends along a depth direction of the mounting hole, and the second positioning portion extends along an extending direction, which is vertical to the depth direction. The second positioning portion is engaged between the bottom surface of the mounting hole and the top cover.

According to an embodiment of the present invention, the engaging plate includes a first engaging unit and a second engaging unit opposite to the first engaging unit. The bottom cover has a second main body. The engaging hook extends from one side of the second main body, in which the second main body covers the second engaging unit.

According to an embodiment of the present invention, the mounting member has at least one convex post. The sliding member has at least one elongated hole corresponding to the convex post, in which the convex post is set in the elongated hole, and the sliding member is slidable along an axle line. A long axis of the elongated hole is parallel to the axle line.

According to the aforementioned object, a display device is provided. The display device includes a back plate, a light guide plate, a light source, the aforementioned a frame assembly and a display panel. The light guide plate is disposed in the back plate, in which the light guide plate has a light-incident surface. The light source is disposed adjacent to the light-incident surface. The mounting member of the frame assembly is disposed on the back plate or is a portion of the back plate. The display panel is disposed on the frame assembly.

According to the aforementioned embodiments of the present invention, the sliding member is used to simultaneously fix the top cover and the bottom cover, thereby reducing the number of screws used in the conventional display device, thus simplifying the assembling process and the appearance of the conventional display device. In addition, the display device is a wedge-shaped structure and has an accommodating space which can be used to receive electronic components required by the display device, thereby achieving better succinct appearance, such that the display device is suitable to use in a large-sized TV product and meets an aesthetic design trend of flat-back type display device.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1A:
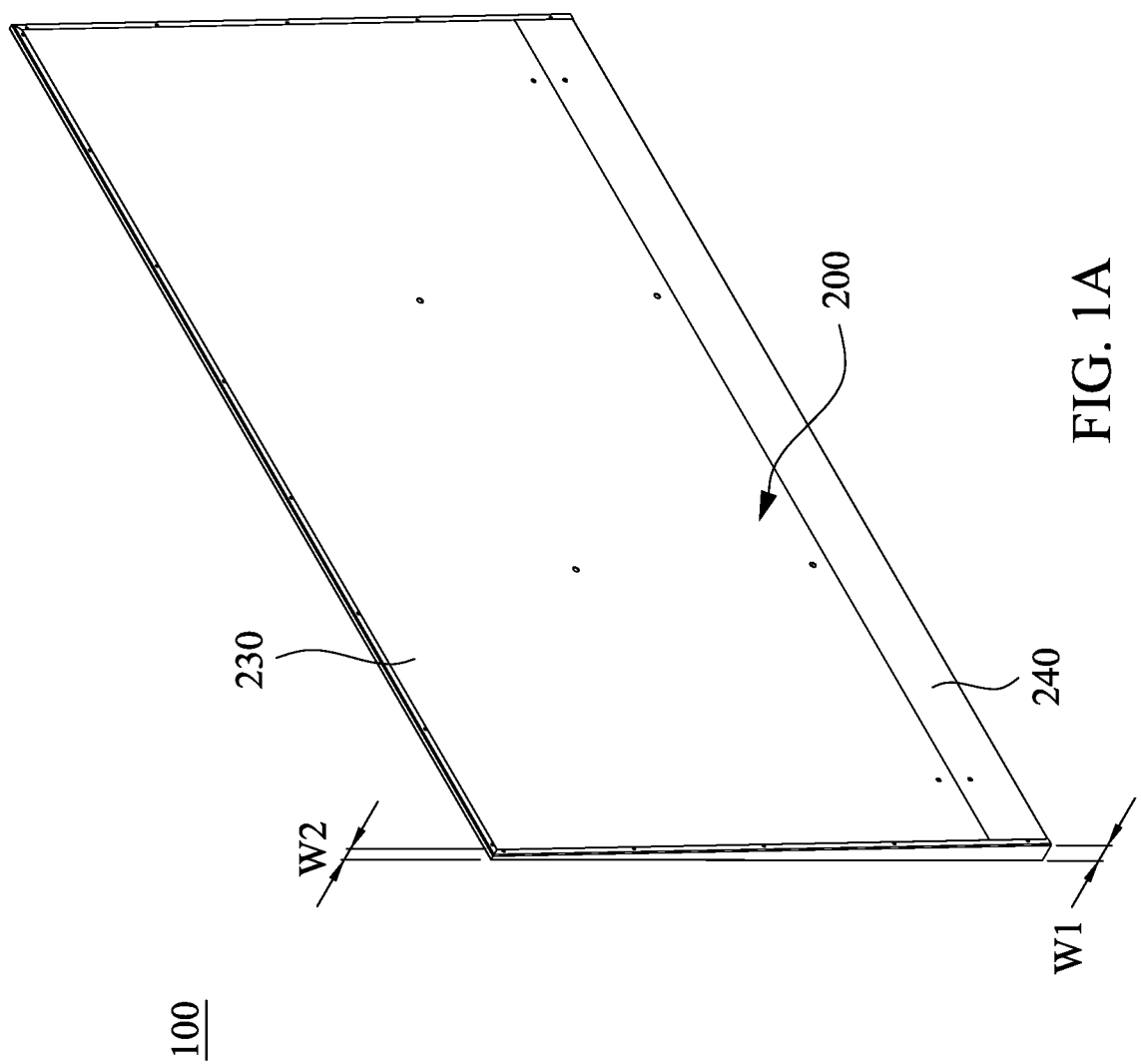
FIG. 1A is a schematic structural diagram showing a display device in accordance with an embodiment of the present invention.

Reference will now be made in detail to the present embodiments of the invention, examples of which are illustrated in the accompanying drawings. Wherever possible, the same reference numbers are used in the drawings and the description to refer to the same or like parts.

Figure 1B:
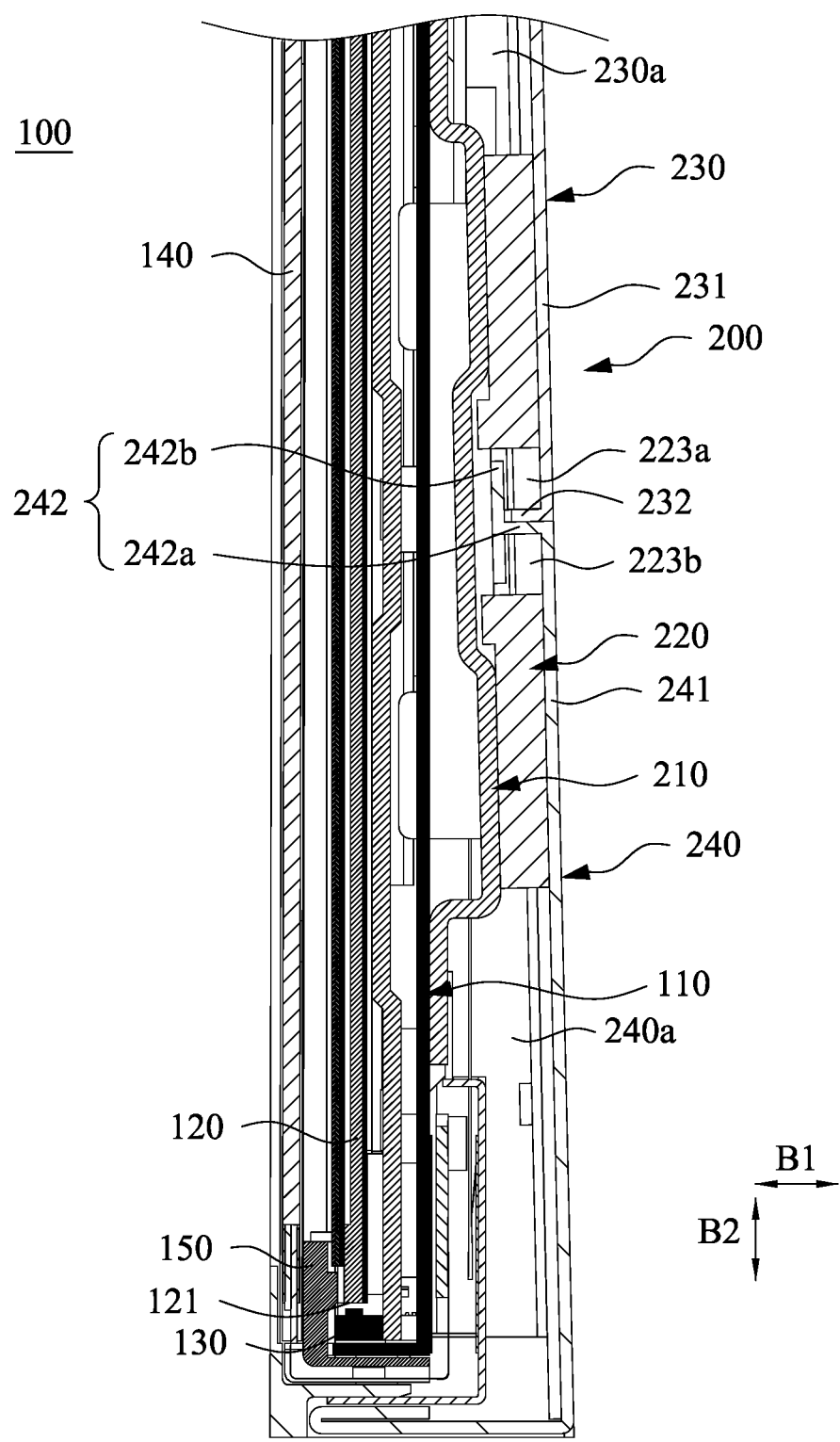
FIG. 1B is a partial cross-sectional view showing the display device in accordance with the embodiment of the present invention.

Referring to FIG. 1A and FIG. 1B, FIG. 1A and FIG. 1B are a schematic structural diagram and a partial cross-sectional view showing a display device in accordance with an embodiment of the present invention. The display device 100 of the present embodiment mainly includes a back plate 110, a light guide plate 120, a light source 130, a frame assembly 200 and a display panel 140. The light guide plate 120 and the light source 130 are disposed in the back plate 110, and the light source 130 is disposed adjacent to a light-incident surface 121 of the light guide plate 120. The display panel 140 is carried on a mold frame 150. In the present embodiment, the frame assembly 200 is mainly disposed on the back side of the back plate 110 and can be used as an appearance member, so that the frame assembly 200 can cover electronic components used in the display device 100.

Figure 2:
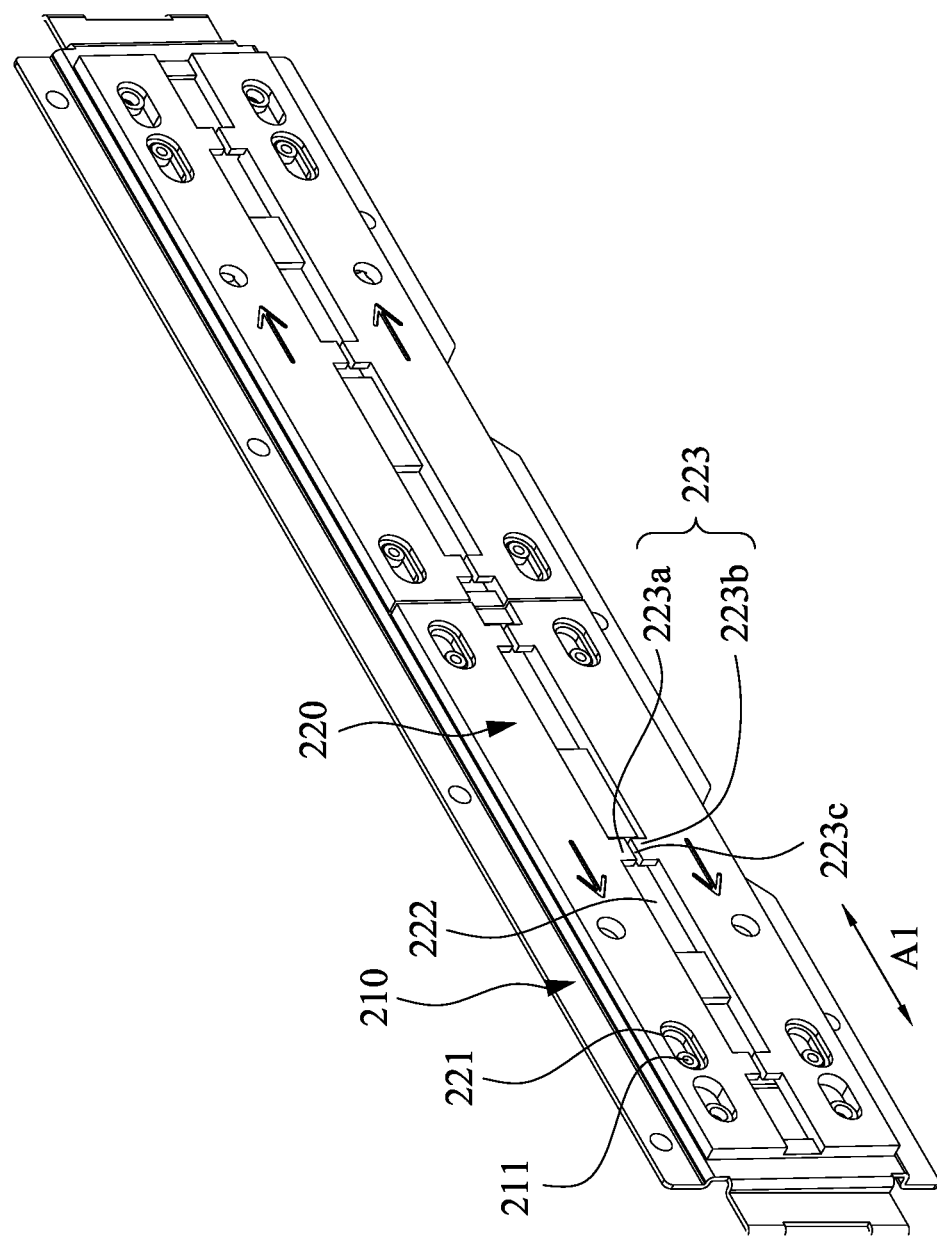
FIG. 2 is a schematic structural diagram showing a mounting member and a sliding member in accordance with an embodiment of the present invention.

Simultaneously referring to FIG. 1B and FIG. 2, in which FIG. 2 is a schematic structural diagram showing a mounting member and a sliding member in accordance with an embodiment of the present invention. The frame assembly 200 of the present embodiment mainly includes a mounting member 210, a sliding member 220, a top cover 230 and a bottom cover 240. In the present embodiment, the mounting member 210 can be directly fixed on a back surface of the back plate 110, or can be fixed on other components (e.g. a reinforcing member of the back plate) located on the back surface of the back plate 110. As shown in FIG. 2, the mounting member 210 has at least one convex post 211. The sliding member 220 is slidably disposed on the mounting member 210. In the present embodiment, the sliding member 220 has at least one elongated hole 221. The disposition location and the number of the elongated hole 221 of the sliding member 220 are corresponding to the disposition location and the number of the convex post 211 of the mounting member 210, so that the sliding member 220 can be fixed on the mounting member 210 by setting the convex post 211 into the elongated hole 221. In the present embodiment, a long axis of the elongated hole 221 is parallel to an axle line A1, so that the sliding member 220 can be slid along the axle line A1. In one example, an extending direction of the axle line A1 is parallel to a long side of the back plate 110.

In some embodiments, the convex post 211 includes a stud and a screw, and a length of the stud is approximately equal to the depth of the elongated hole. Therefore, after the stud is put into the sliding member 220, the screw is screwed on the stud to slidably fix the sliding member 220 to the mounting member 210. In other embodiments, the mounting member 210 can be a portion of the back plate 110. More specifically, in the manufacturing process of the back plate 110, the convex post of the mounting member can be formed by a stamping process, so that the sliding member 220 can be slidably disposed on the back plate 110.

Figure 3A:
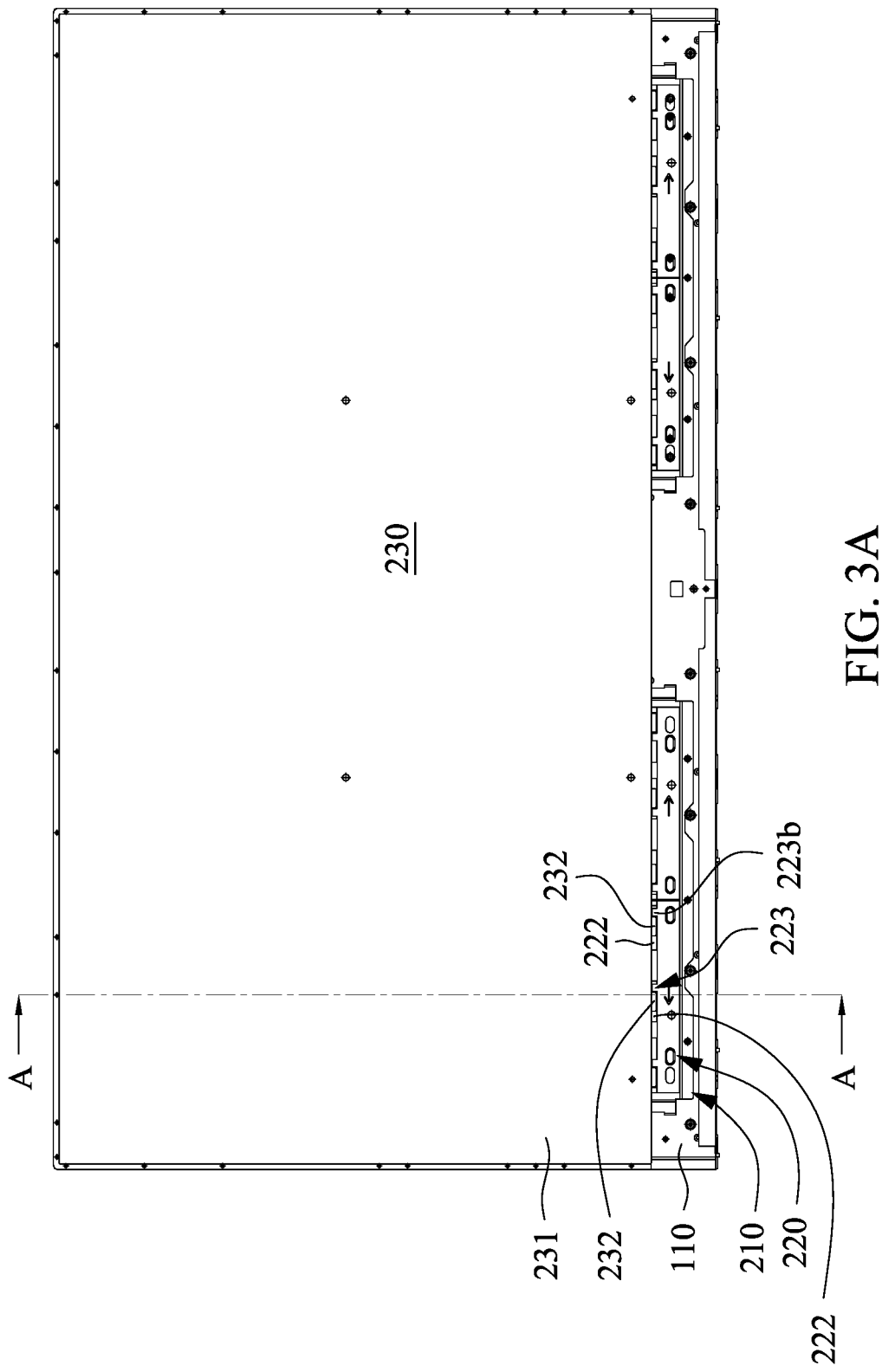
FIG. 3A is a schematic diagram showing the sliding member located at a first position relative to a top cover.
Figure 3B:
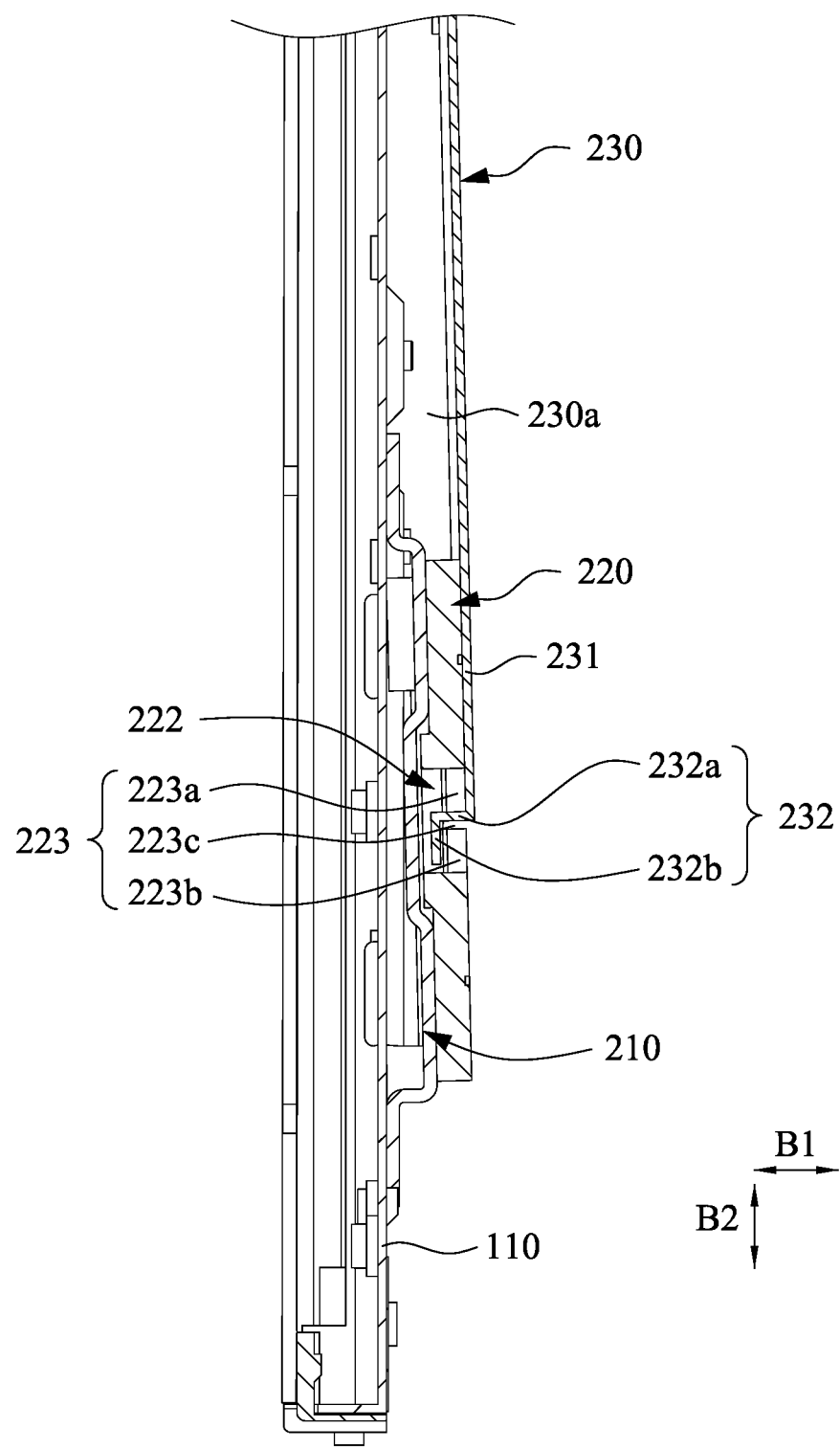
FIG. 3B is a partial cross-sectional view taken along a line A-A in FIG. 3A.

Referring to FIG. 2 again, the sliding member 220 has at least one mounting hole 222 and at least one engaging plate 223. The engaging plate 223 includes a first engaging unit 223a and a second engaging unit 223b opposite to the first engaging unit 223a, and an engaging passageway 223c is defined between the first engaging unit 223a and the second engaging unit 223b. Also referring to FIG. 3A and FIG. 3B, FIG. 3A is a schematic diagram showing the sliding member located at a first position relative to a top cover, and FIG. 3B is a partial cross-sectional view taken along a line A-A in FIG. 3A. The top cover 230 has a first main body 231 and at least one protruding lug 232, and the protruding lug 232 extends from one side of the first main body 231. As shown in FIG. 3B, the first main body 231 covers the first engaging unit 223a of the engaging plate 223, and the protruding lug 232 is accommodated in the mounting hole 222.

More specifically, the protruding lug 232 of the top cover 230 has a first extending portion 232a and a first positioning portion 232b. The first extending portion 232a extends along a depth direction (direction B1 shown in FIG. 3B) of the mounting hole 222. The first positioning portion 232b extends along an extending direction (direction B2 shown in FIG. 3B) which is approximately vertical to the depth direction B1. In the present embodiment, as shown in FIG. 3A, when the sliding member 220 is located at a first position, the first extending portion 232a of the protruding lug 232 is penetrated through the mounting hole 222, and the first positioning portion 232b of the protruding lug 232 is located at a side of the engaging plate 223 and is not restrained by the engaging plate 223.

Figure 4A:
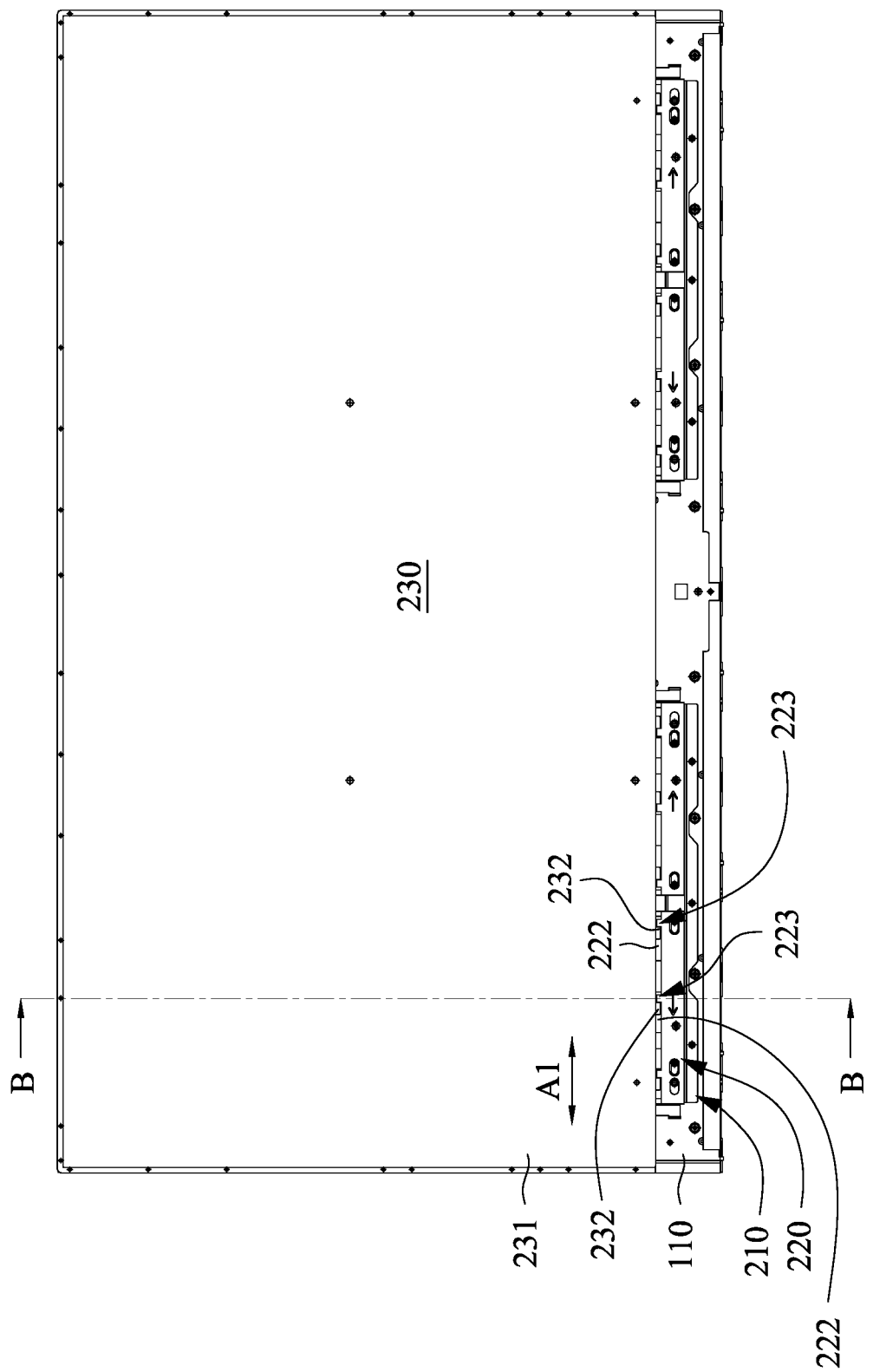
FIG. 4A is a schematic diagram showing the sliding member located at a second position relative to a top cover.
Figure 4B:
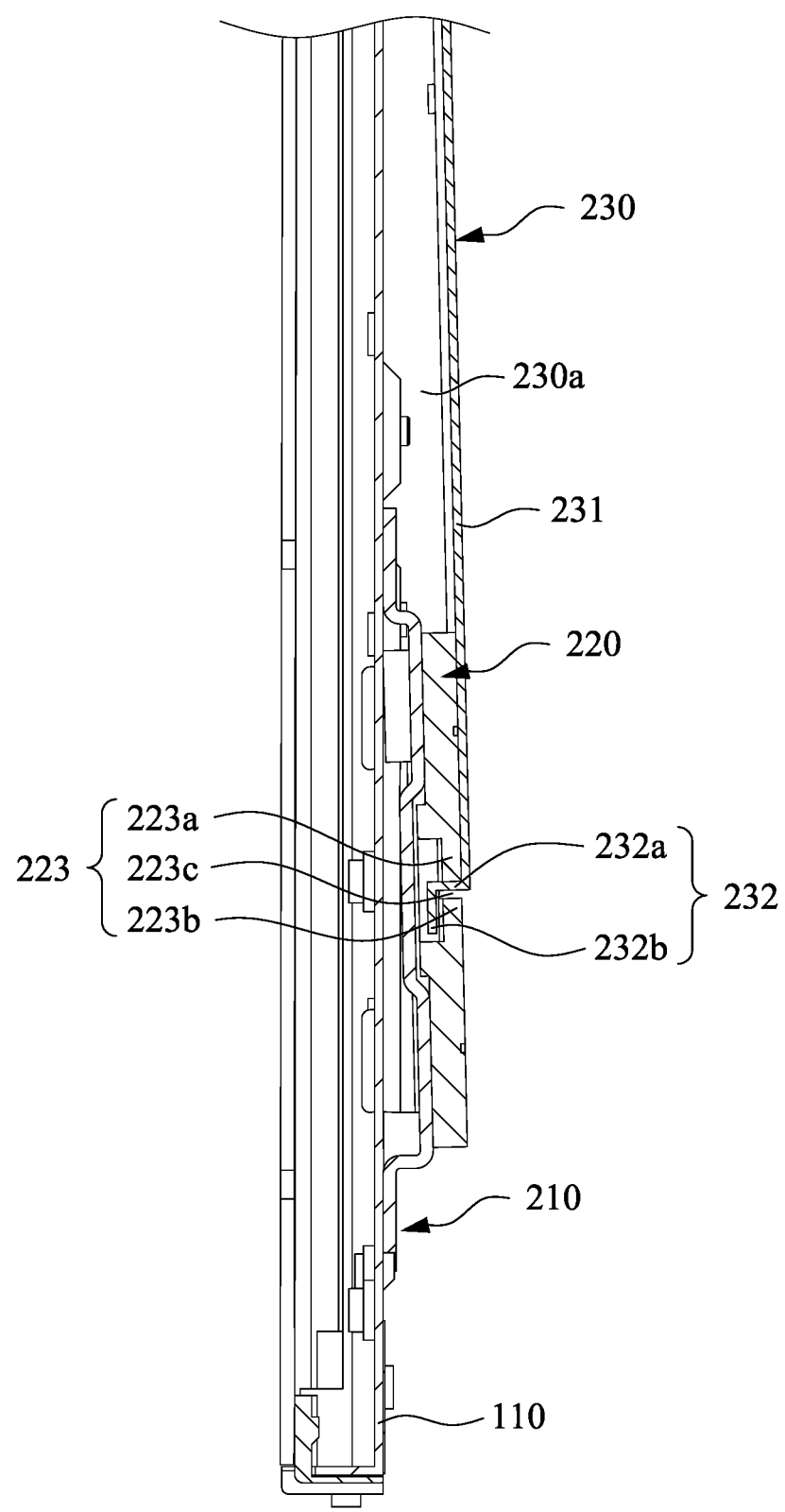
FIG. 4B is a partial cross-sectional view taken along a line B-B in FIG. 4A.

Simultaneously referring to FIG. 4A and FIG. 4B, FIG. 4A is a schematic diagram showing the sliding member located at a second position relative to a top cover, and FIG. 4B is a partial cross-sectional view taken along a line B-B in FIG. 4A. After the sliding member 220 is moved along the axle line A1, the first positioning portion 232b of the protruding lug 232 can be restrained by the engaging plate 223, and the first extending portion 232a is inserted and embedded in the engaging passageway 223c. More specifically, the first positioning portion 232b of the protruding lug 232 is restrained by the second engaging unit 223b of the engaging plate 223. Therefore, by using the sliding member 220 to be engaged with and to restrain the protruding lug 232 of the top cover 230, the top cover 230 can be fixed on the back plate 110.

Simultaneously referring to FIG. 3A and FIG. 4A, when the sliding member 220 is located at the first position and the protruding lug 232 of the top cover 230 is placed in the mounting hole 222, the remained space of the mounting hole 222 is relatively small (as shown in FIG. 3A). When the sliding member 220 is located at the second position, the engaging plate 223 of the sliding member 220 is moved onto the protruding lug 232 to restrain the protruding lug 232. In other words, the engaging plate 223 of the sliding member 220 is overlapped with a portion of the protruding lug 232, thereby increasing the remained space of the mounting hole 222. Therefore, the increased space of the mounting hole 222 can be used to accommodate an engaging hook 242 of the bottom cover 240 (as shown in FIG. 5B).

Figure 5A:
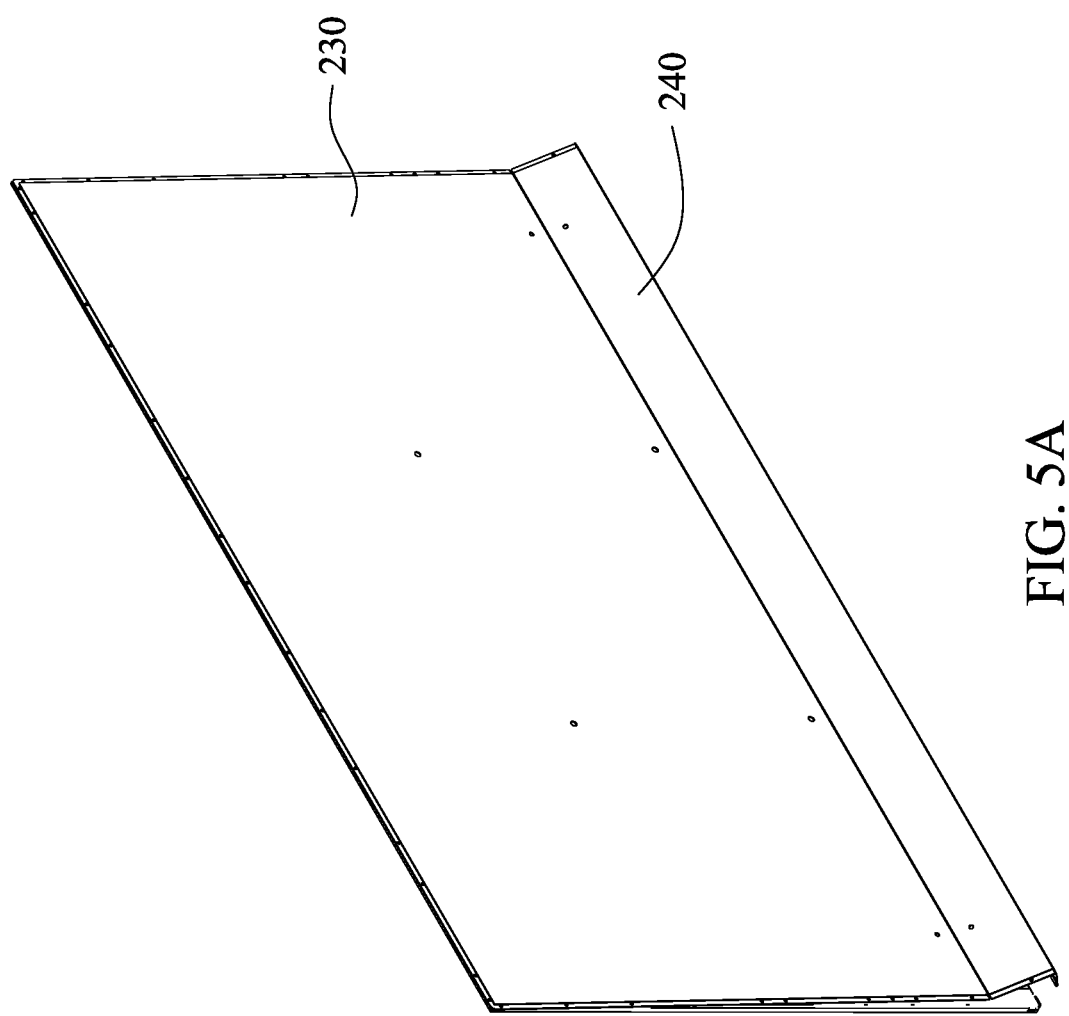
FIG. 5A is an operation diagram showing the bottom cover being disposed onto the mounting member and the sliding member.
Figure 5B:
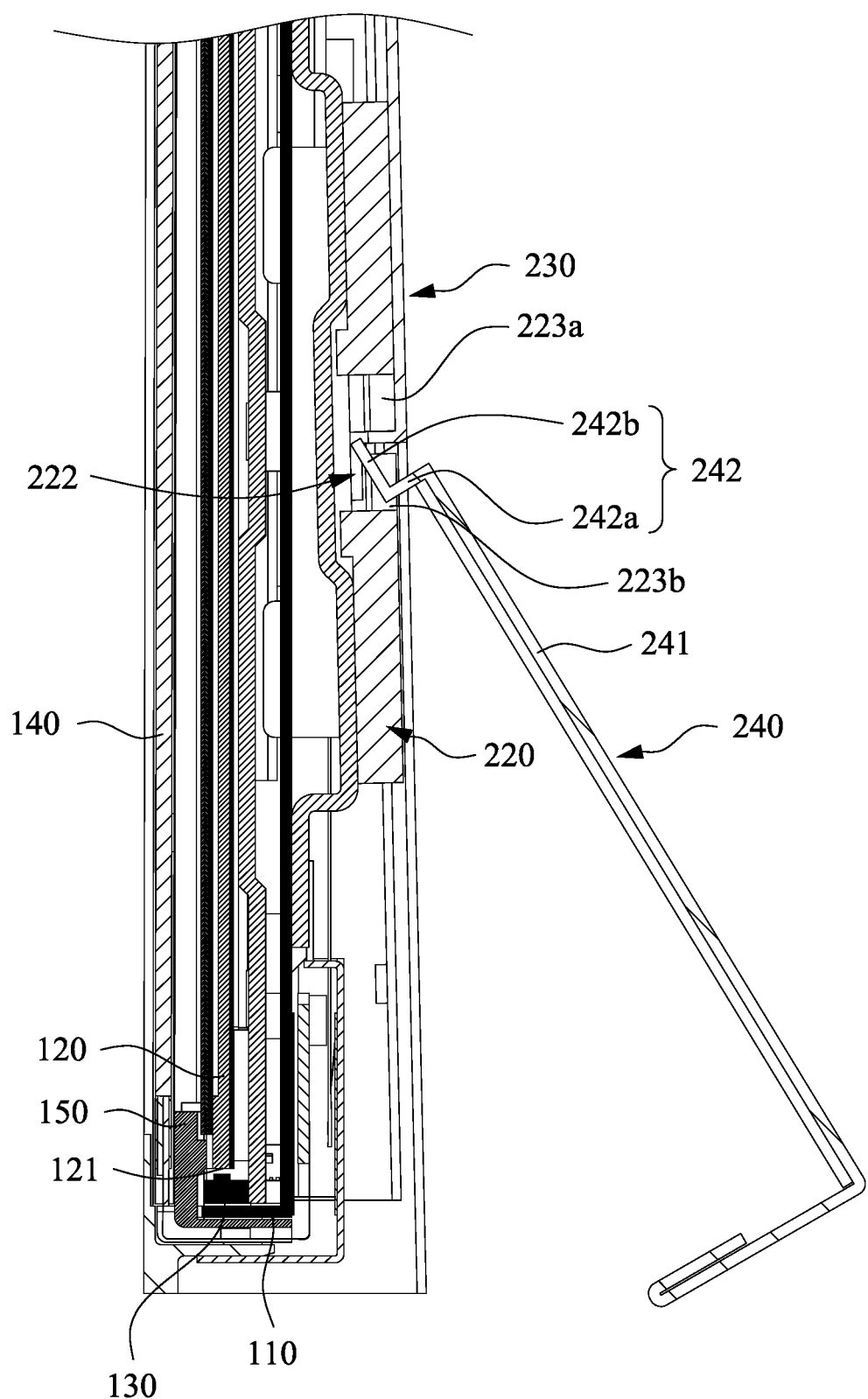
FIG. 5B is a partial cross-sectional view of FIG. 5A.

As shown in FIG. 5A and FIG. 5B, FIG. 5A is an operation diagram showing the bottom cover being disposed onto the mounting member and the sliding member, and FIG. 5B is a partial cross-sectional view of FIG. 5A. After the top cover 230 is fixed on the sliding member 220, the bottom cover 240 is then disposed onto the sliding member 220. As shown in FIG. 5A and FIG. 5B, the bottom cover 240 has a second main body 241 and at least one engaging hook 242. The engaging hook 242 extends from a side of the second main body 241 and can be installed in the mounting hole 222. As shown in FIG. 5B, the engaging hook 242 of the bottom cover 240 includes a second extending portion 242a and a second positioning portion 242b. In the process of fixing the bottom cover onto the sliding member 220, the engaging hook 242 is first inclinedly inserted into the mounting hole 222. Then, the second main body 241 of the bottom cover 240 is pushed towards the back plate 110, so that the second extending portion 242a and the second positioning portion 242b can be engaged between the bottom surface of the mounting hole 222 and the top cover 230, and the second main body 241 can cover the second engaging unit 223b (as shown in FIG. 1).

Referring to FIG. 1B, when the bottom cover 240 is fixed on the sliding member 220, the second extending portion 242a extends along the depth direction B1 of the mounting hole 222, and the second positioning portion 242b extends along the extending direction B2 which is approximately vertical to depth direction. Moreover, when the bottom cover 240 is fixed on the sliding member 220, an outer surface of the bottom cover 240 flushes with an outer surface of the top cover 230, so as to form a planar surface.

Referring to FIG. 1A and FIG. 1B again, the mounting member 210 and the sliding member 220 of the present embodiments are disposed on a back surface near a bottom side of the back plate 110. Therefore, when a side of the top cover 230 near the protruding lug 232 is engaged with the sliding member 220, and other side of the top cover 230 away from the protruding lug 232 covers a side of the back plate 110 away from light source 130, the top cover 230 is inclined relative to the back plate 110 to form a space 230a therebetween (as shown in FIG. 3B and FIG. 4B). Similarly, when a side of the bottom cover 240 near the engaging hook 242 is engaged with the sliding member 220, and other side of the bottom cover 240 away from the engaging hook 242 covers a side of the back plate 110 near the light source 130, the bottom cover 240 is also inclined relative to the back plate 110 to form a space 240a therebetween (as shown in FIG. 1B). Therefore, electronic components required by the display device 100 can be hidden in the space 230a between the top cover 230 and the back plate 110 or hidden in the space 240a between the bottom cover 240 and the back plate 110, thereby simplifying the appearance of the display device 100. In addition, when the top cover 230 and the bottom cover 240 are disposed on the sliding member 220, a bottom width W1 of the display device 100 is greater than a top width W2 of the display device 100, so as to form a wedge-shaped display device 100.

According to the aforementioned embodiments of the present invention, the sliding member is used to simultaneously fix the top cover and the bottom cover, thereby reducing the number of screws used in the conventional display device, thus simplifying the assembling process and the appearance of the conventional display device. In addition, the display device is a wedge-shaped structure and has an accommodating space which can be used to receive electronic components required by the display device, thereby achieving succinct appearance, such that the display device is suitable to use in a large-sized TV product and meets an aesthetic design trend of flat-back type.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A frame assembly, comprising:
    a mounting member;
    a sliding member slidably disposed on the mounting member, wherein the sliding member has at least one mounting hole and at least one engaging plate, wherein the engaging plate includes a first engaging unit and a second engaging unit opposite to the first engaging unit, and an engaging passageway is defined between the first engaging unit and the second engaging unit;
    a top cover having at least one protruding lug, wherein the protruding lug is accommodated in the mounting hole, and at least one portion of the protruding lug is positioned by the engaging plate, wherein the protruding lug includes a first extending portion and a first positioning portion, and the first extending portion is engaged in the engaging passageway; and
    a bottom cover having at least one engaging hook, wherein the engaging hook is engaged in the mounting hole;
    wherein the sliding member is slidable along an axle line, and the first positioning portion of the protruding lug can be restrained by the engaging plate, and the first extending portion is inserted and embedded in the engaging passageway.

2. The frame assembly of claim 1, wherein the first extending portion extends along a depth direction of the mounting hole, and the first positioning portion extends along an extending direction which is vertical to the depth direction.

3. The frame assembly of claim 2, wherein
    the top cover has a first main body, wherein the protruding lug extends from one side of the first main body, and the first main body covers the first engaging unit, and the first positioning portion of the protruding lug is restrained by the second engaging unit of the engaging plate.

4. The frame assembly of claim 1, wherein the engaging hook of the bottom cover includes a second extending portion and a second positioning portion, and the second extending portion extends along a depth direction of the mounting hole, and the second positioning portion extends along an extending direction which is vertical to the depth direction, and the second positioning portion is engaged between the bottom surface of the mounting hole and the top cover.

5. The frame assembly of claim 4, wherein
    the bottom cover has a second main body, the engaging hook extends from one side of the second main body, wherein the second main body covers the second engaging unit.

6. The frame assembly of claim 1, wherein
    the mounting member has at least one convex post; and
    the sliding member has at least one elongated hole corresponding to the convex post, wherein the convex post is set in the elongated hole, and a long axis of the elongated hole is parallel to the axle line.

7. A display device, comprising:

a back plate;

a light guide plate disposed in the back plate, wherein the light guide plate has a light-incident surface;

a light source disposed adjacent to the light-incident surface;

a frame assembly as claimed in claim 1, wherein the mounting member of the frame assembly is disposed on the back plate or is a portion of the back plate; and a display panel disposed on the frame assembly.

* * * * *